US007405668B2

(12) United States Patent
Wang

(10) Patent No.: US 7,405,668 B2
(45) Date of Patent: Jul. 29, 2008

(54) MOBILE COMMUNICATION DEVICE FOR RECEIVING ALARM WARNINGS AND A METHOD THEREOF

(75) Inventor: Shi-En Wang, Taipei County (TW)

(73) Assignee: Lite-On Technology Corporation, Taipei (TW)

( * ) Notice: Subject to any disclaimer, the term of this patent is extended or adjusted under 35 U.S.C. 154(b) by 236 days.

(21) Appl. No.: 11/330,362

(22) Filed: Jan. 10, 2006

(65) Prior Publication Data

US 2007/0008109 A1 Jan. 11, 2007

(30) Foreign Application Priority Data

Jun. 16, 2005 (TW) .............................. 94119978 A

(51) Int. Cl.
*G01W 1/00* (2006.01)

(52) U.S. Cl. ................. 340/601; 340/539.1; 455/404.1; 455/414.2

(58) Field of Classification Search .............. 340/539.1, 340/539.13, 539.17, 500, 506, 601; 702/3; 342/36; 455/404.1, 414.1–414.4
See application file for complete search history.

(56) References Cited

U.S. PATENT DOCUMENTS

| | | | | |
|---|---|---|---|---|
| 6,177,873 | B1 * | 1/2001 | Cragun | 340/601 |
| 7,049,971 | B2 * | 5/2006 | Guillory | 340/601 |
| 7,248,159 | B2 * | 7/2007 | Smith | 340/539.13 |
| 2001/0010490 | A1 * | 8/2001 | Bellin | 340/7.46 |
| 2003/0193394 | A1 * | 10/2003 | Lamb | 340/539.28 |
| 2005/0242944 | A1 * | 11/2005 | Bankert et al. | 340/531 |

* cited by examiner

*Primary Examiner*—Davetta W. Goins
*Assistant Examiner*—Hongmin Fan
(74) *Attorney, Agent, or Firm*—Quintero Law Office

(57) ABSTRACT

A method for receiving alarm warnings with a mobile communication device, comprising the steps of: storing a district-warning radio frequency contrast table in the mobile communication device, wherein the district-warning radio frequency contrast table records a relationship between a plurality of districts and a plurality of warning radio frequencies for broadcasting the audio warning messages corresponding to one of the plurality of districts; finding a first warning radio frequency corresponding to the first district of a user location in the district-warning radio frequency contrast table, wherein the user carries the mobile communication device, the first district is one of the plurality of districts, and the first warning radio frequency is one of the plurality of warning radio frequency; and receiving a radio signal according to the first warning radio frequency and demodulating the radio signal to obtain a first audio warning message corresponding to the first district.

18 Claims, 6 Drawing Sheets

300

| 302 District name | 304 District code | 306 Warning radiofrequency |
|---|---|---|
| 302a (Los Angeles) | 006037 | 162.550 kHz 306a |
| 302b (Orange) | 006059 | 162.450 kHz 306b |
| 302c (San Diego) | 006073 | 162.400 kHz 306c |

FIG. 3

400

| 402 Warning text | Digital code 404 |
|---|---|
| 402a (Emergency Action Notification) | EAN 404a |
| 402b (Tornado Watch) | TOA 404b |
| 402c (Hurricane Watch) | HUA 404c |
| 402d (Civil Danger Watch) | CDA 404d |
| 402e (End of Message) | EOM 404e |

FIG. 4

MOBILE COMMUNICATION DEVICE FOR RECEIVING ALARM WARNINGS AND A METHOD THEREOF

BACKGROUND OF THE INVENTION

1. Field of the Invention

The present invention relates to a mobile communication device, and more particularly to a mobile communication device for receiving radio alarm warnings.

2. Description of the Related Art

Uncontrollable natural disasters such as tornados, downpours, and floods or sudden man-made disasters such as wars and terrorist attacks are often unpredictable and sacrifice numerous lives or cause heavy damage to civil property. Therefore, many countries set up a radio alarm systems for notifying the public of alarm warnings as soon as possible. Thus, the public can take appropriate measures in a timely manner to prevent danger or be evacuated from dangerous areas to reduce the impact of the disaster, thus lives and civil and private property can be protected.

Presently there are two kinds of radio alarm systems, one is to broadcast alarm warnings with loudspeakers, and the other is to broadcast alarm warnings with radio signals received by televisions, radio sets, or alarm receivers. The former is limited by the number and area covered by the loudspeakers, and is useless when the dangerous areas exceed that covered. The latter is currently the most efficient radio alarm system. For example, the national oceanic and atmosphere administration (NOAA) has more than 900 national weather service radio locations for broadcasting alarm warnings to a coverage area encompassing the United States.

Nevertheless, the alarm warnings of the latter radio alarm system can only be heard when there is a television or a radio set nearby. Thus, the influence of the radio alarm system using televisions or radio sets is limited. In addition, most of the alarm receivers are not portable, and ordinary people will not typically carry an alarm receiver even if the alarm receiver is portable. Therefore, it is difficult for people to always receive alarm warnings when disasters occur.

Presently there is an attempt to receive alarm warnings through mobile communication devices. This attempt utilizes the base stations of telecommunication service providers to send audio warning messages to mobile communication devices of receivers. However, the reception coverage is limited by the strength of communication signals and setting area of the base stations. The reception coverage of the base stations is far more restricted than that of radio broadcasting, and it is impossible to receive audio warning messages at places where there is no base station. In addition, the government cannot know the precise location of individuals and fails to send audio warning messages to them in a timely manner.

BRIEF SUMMARY OF THE INVENTION

A method for receiving alarm warnings with a mobile communication device is provided. The method comprises the steps of: storing a district-warning radio frequency contrast table in the mobile communication device, wherein the district-warning radio frequency contrast table records a relationship between a plurality of districts and a plurality of warning radio frequencies for broadcasting the audio warning messages corresponding to one of the plurality of districts; finding a first warning radio frequency corresponding to the first district of a user location in the district-warning radio frequency contrast table, wherein when the user takes the mobile communication with him, the first district is one of the plurality of districts, and the first warning radio frequency is one of the plurality of warning radio frequency; receiving a radio signal according to the first warning radio frequency and demodulating the radio signal to obtain a first audio warning message corresponding to the first district.

A mobile communication device for receiving alarm warnings is provided. The mobile communication device comprises: a memory module, for storing a district-warning radio frequency contrast table, wherein the district-warning radio frequency contrast table records a relationship between a plurality of districts and a plurality of warning radio frequencies for broadcasting the audio warning messages corresponding to one of the plurality of districts; a signal processing module; coupled to the memory module, for finding a first warning radio frequency corresponding to the first district of a user location in the district-warning radio frequency contrast table, wherein the first district is one of the plurality of districts, and the first warning radio frequency is one of the plurality of warning radio frequency; and a radio receiver module, coupled to the signal processing module, for receiving a radio signal according to the first warning radio frequency and demodulating the radio signal to obtain a first audio warning message corresponding to the first district.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3 shows an example of the district-warning radio frequency contrast table according to the invention;

FIG. 4 shows an example of a disaster-code contrast table according to the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
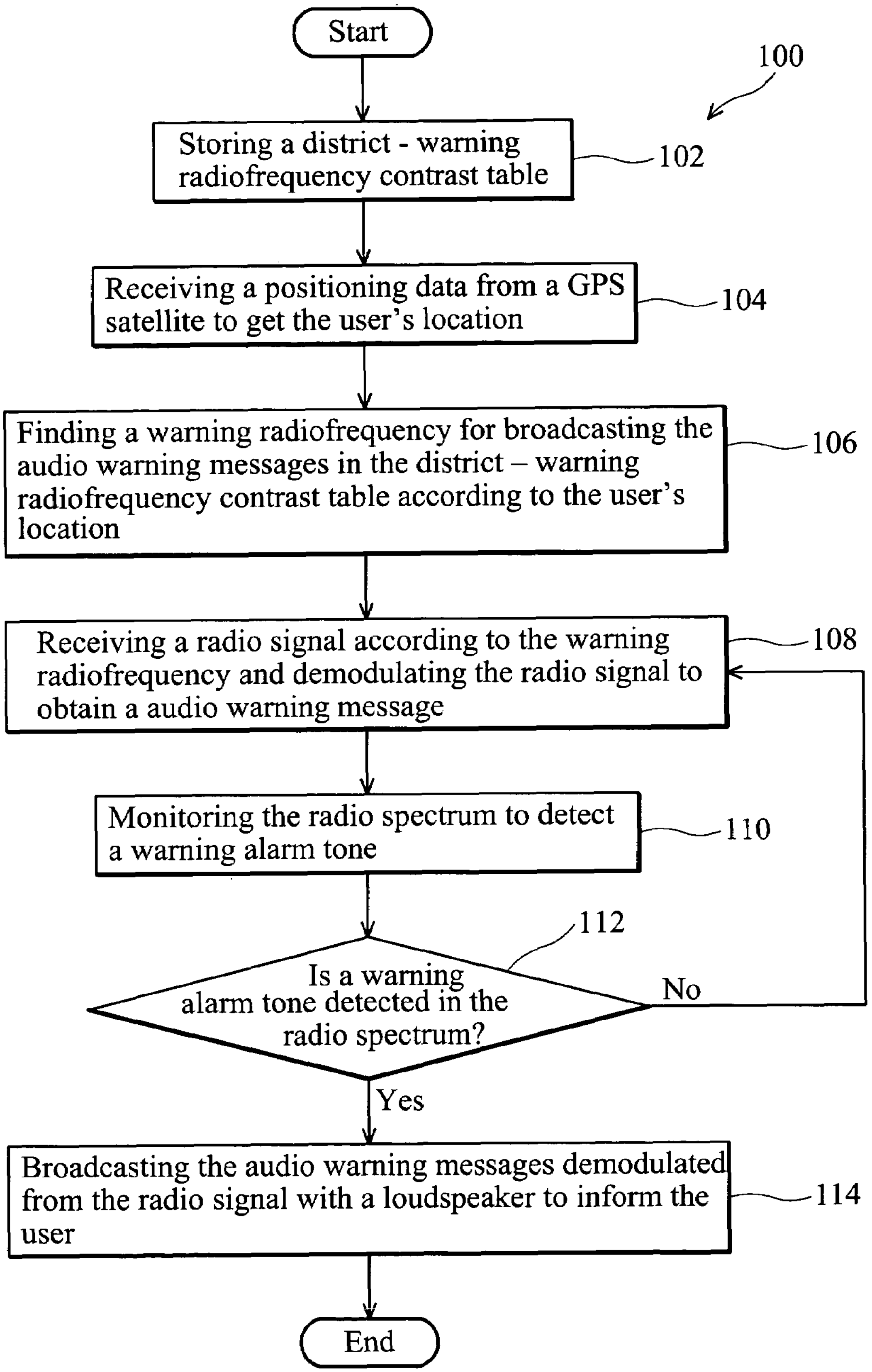
FIG. 1 is a flowchart of a method for receiving alarm warnings with a mobile communication device according to the invention.

FIG. 1 is a flowchart of a method 100 for receiving alarm warnings with a mobile communication device according to the invention. The mobile communication devices mentioned in the disclosure can be a cell phone, a smart phone, and the like. Furthermore, although the embodiments of the invention in the disclosure are detailed with a mobile communication device, the communication device can be replaced with any portable electronic device with audio processing capability, such as an MP3 player, a walkman, or a personal digital assistant (PDA). In addition, the mobile communication device must be capable of receiving radio signals. The radio receiving capability can be appended to an ordinary portable electronic device by updating a radio receiving software module which utilizes existing antennas, or by attaching a radio receiving hardware module to the portable electronic device.

Method 100 starts with step 102 for storing a district-warning radio frequency contrast table. The district-warning radio frequency contrast table includes the name or code of each district and the corresponding radio frequency for broadcasting the audio warning messages in the district. Thus, the mobile communication device can find the radio frequency to receive the alarm warning radio signals as long as the user location is provided, and the user location can be input by the user or be detected automatically by the mobile communication device with a global positioning system (GPS) module. FIG. 3 shows an example of the district-warning radio frequency contrast table 300. Table 300 includes three columns: a district name 302, a district code 304, and a warning radio frequency 306. Nevertheless, only one of the district name 302 or the district code 304 to be included in the table 300 is sufficient for showing the contrast relationship between the district and the warning radio frequency.

If the mobile communication device has a GPS module for automatically detecting the user location, the mobile communication device is capable of receiving a positioning data from a GPS satellite to obtain the user location in step 104. The mobile communication device then finds a warning radio frequency for broadcasting the audio warning messages in the district-warning radio frequency contrast table according to the user location in step 106. The mobile communication device then receives a radio signal according to the warning radio frequency and demodulates the radio signal to obtain an audio warning message in step 108. Nevertheless, the audio warning messages are not broadcast with a loudspeaker of the mobile communication device to notify the user. Thus, the ordinary function of the mobile communication device is not disturbed when an alarm warning is received at the same time.

The mobile communication device will continue monitoring the spectrum to detect a warning alarm tone in step 110. The warning alarm tone is a sound indicating that an audio warning message is currently being broadcast, and the frequency of the warning alarm tone is stipulated by the government. For example, the frequency of warning alarm tone is 1050 Hz in the United States. If the warning alarm tone is detected in the spectrum in step 112, the mobile communication device will broadcast the audio warning messages demodulated from the radio signal with a loudspeaker to inform the user in step 114. Thus, the user can be informed of the disaster in a timely manner via the radio warning broadcast to the mobile communication device and take appropriate protective measures.

Method 100 has other advantages. When the user is moving across different districts, because the mobile communication device can automatically detect that the user location has changed via the GPS module, the warning radio frequency will be automatically adjusted to receive the alarm warnings radio of the current user location. Referring to FIG. 3, the user location is assumed to be in district 302*a* of Los Angeles, and the warning radio frequency 306*a* corresponding thereto is 162.55 KHz. If Los Angeles neighbors to San Diego, when the user enters the district 302*c* of San Diego from the district 302*a* of Los Angeles, the mobile communication device will automatically detect that the user location has changed via the GPS module, and the warning radio frequency will be automatically updated to the warning radio frequency 306*c* of 162.4 KHz corresponding to the district 302*c* of San Diego. Thus, when a disaster occurs, the user will be informed in a timely manner of the disaster regardless of location via the mobile communication device.

Figure 2:
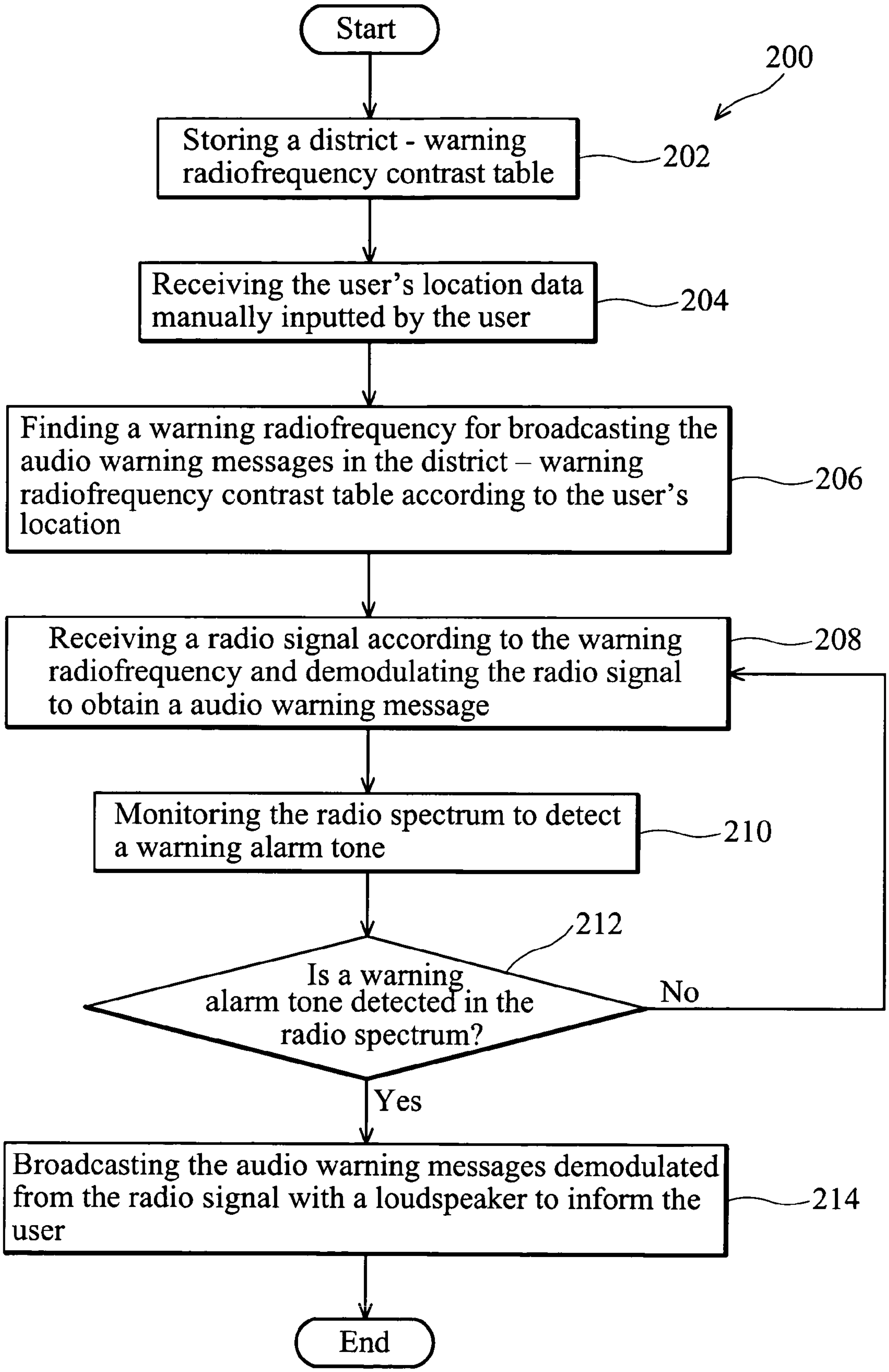
FIG. 2 shows a flow chart of another method for receiving alarm warnings with a mobile communication device according to the invention.

FIG. 2 shows a flowchart of a method 200 for receiving alarm warnings with a mobile communication device according to the invention. The method 200 is substantially similar to the method 100. Because some mobile communication devices do not have a GPS module, the user can manually input his location into the mobile communication device. Method 200 only differs from method 100 in that the step 104 of receiving a positioning data about the user location from a satellite is replaced with the step 204 of receiving the manually input user location data.

There is still further a function of the method 100 and 200 to show a warning text message on the screen of the mobile communication device. This function is achieved by transmitting digital code for indicating the disaster category through a high-frequency radio signal carried with the warning radio frequency. Therefore, the mobile communication device-can demodulate high-frequency radio signals to retrieve the digital code, and the digital code is decoded to obtain the information about the disaster category.

Referring to FIG. 4, it shows an example of a disaster-code contrast table 400 according to the invention. After the mobile communication device retrieves the digital code, the digital code must be decoded according to the disaster-code contrast table 400 to obtain the warning text message for displayed on the screen of the mobile communication device. The disaster-code contrast table 400 indicates a contrast relationship between the digital code and the warning text message. The digital code may be in the ASCII or other format. For example, the code 404*a* of "EAN" represents the warning text message 402*a* of "emergency action notification", the code 404*b* of "TOA" represents the warning text message 402*b* of "tornado watch", the code 404*c* of "HUA" represents the warning text message 402*c* of "hurricane watch", and the code 404*d* of "CDA" represents the warning text message 402*d* of "civil danger watch". These codes are just an explanatory example but should not be interpreted as limiting the invention.

Figure 5:
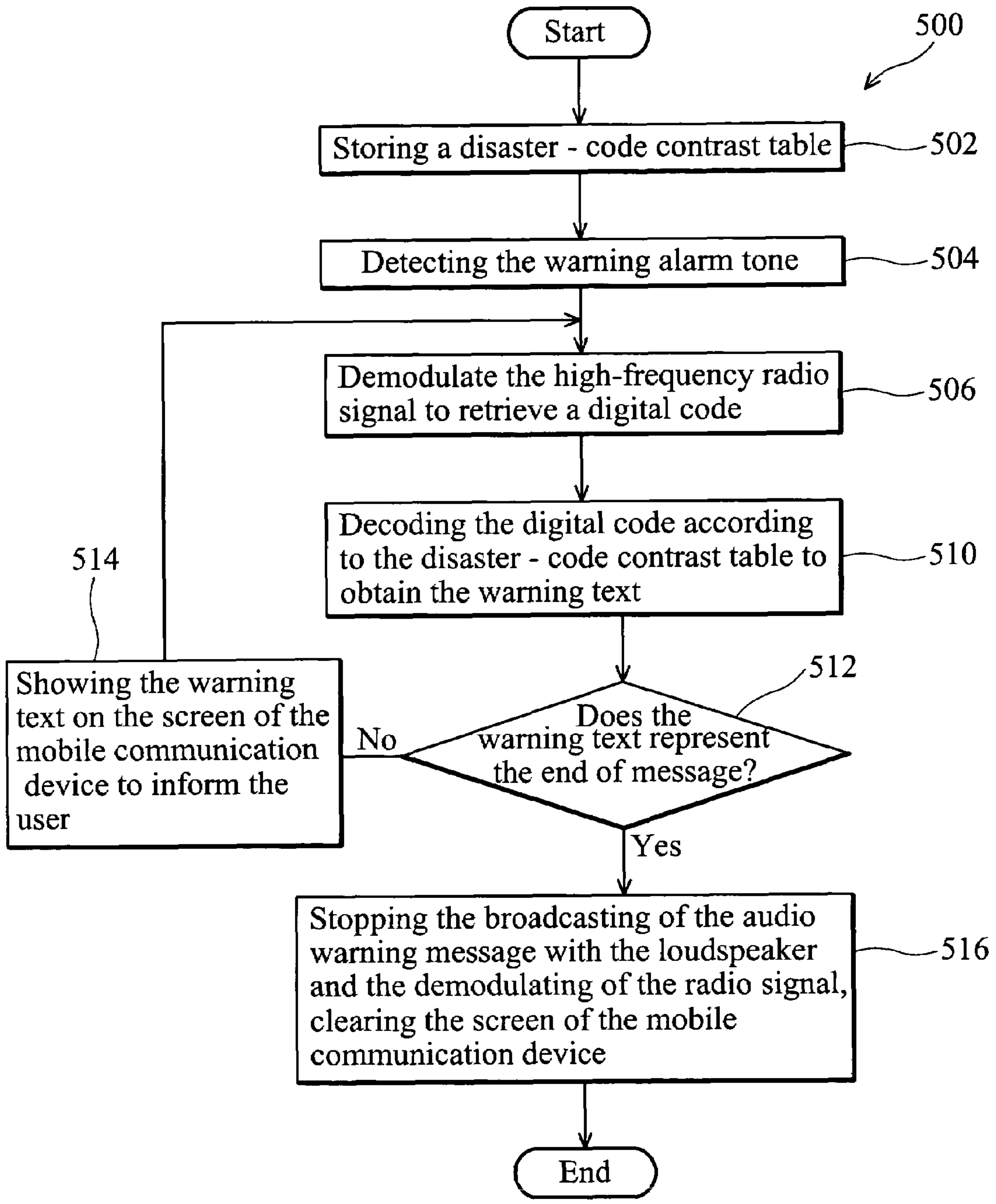
FIG. 5 is a flowchart of a method for showing warning text messages with a mobile communication device.

Referring to FIG. 5, it is a flowchart of a method 500 for showing warning text messages with a mobile communication device. First, a disaster-code contrast table resembling the table 400 is stored in the mobile communication device in step 502. The mobile communication device then demodulates the radio signal and continues monitoring the warning alarm tone as the method 100 in FIG. 1 and the method 200 in FIG. 2. If the warning alarm tone is detected in step 504, the mobile communication device will demodulate the high-frequency radio signal to retrieve the digital codes in step 506 in addition to broadcasting the audio warning message with a loudspeaker in step 114.

The digital code is then decoded according to the disaster-code contrast table to obtain the warning text message in step 510. If the warning text message does not represent the end of message in step 512, the warning text message is displayed on the screen of the mobile communication device. Thus, the user can see the warning text message on the screen immediately, and adopt appropriate actions as soon as possible. If the warning text message is the end of message in step 512, it represents that the alarm warning radio broadcast has been ended. Thus, the broadcasting of the audio warning message with the loudspeaker and the demodulating of the radio signal is stopped in step 516, and the screen of the mobile communication device is cleared. The mobile communication device then returns to the status of monitoring the warning alarm tone.

Figure 6:
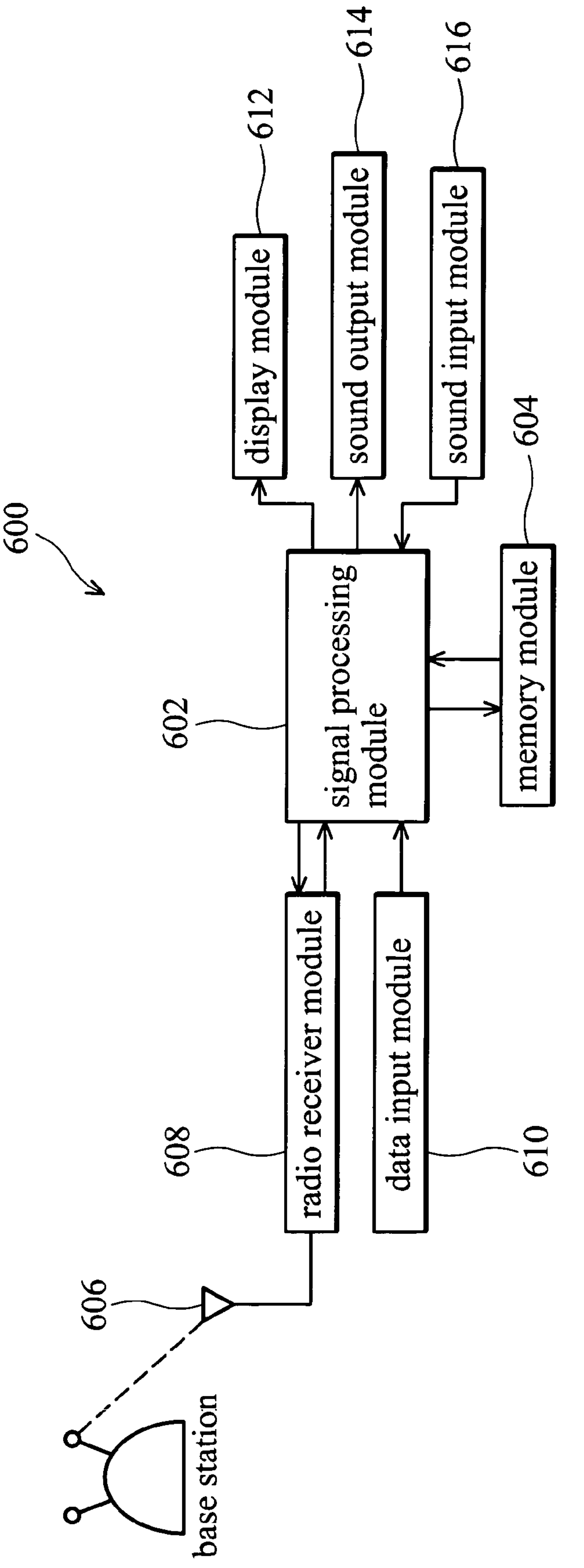
FIG. 6 is a block diagram of an exemplary mobile communication device.

Referring to FIG. 6, it shows a block diagram of an exemplary mobile communication device 600. The mobile communication device 600 includes a signal processing module 602 for controlling the other modules of the mobile communication device 600, converting audio signals between digital format and analog format, and encoding or decoding digital audio signals of various formats. The signal processing module 602 may be a digital signal processor (DSP), a controller, or a chip comprising both the DSP and the controller. The memory module 604 is capable of storing data of the signal processing module 602, and may be a read only memory (ROM) or a random access memory (RAM).

The radio receiver module 608 is coupled to the signal processing module 602. It is capable of receiving a radio signal from a remote base station through an antenna 606, and delivering the radio signal to the signal processing module 602 after the radio signal is demodulated. It is also capable of transforming an audio signal received from the signal processing module 602 into a radio signal, and transmitting the radio signal to the remote base station with the antenna 606.

A user of the mobile communication device 600 can input data through the data input module 610 which may be a set of keys. The sound output module 614 is capable of broadcasting the audio signal from the signal processing module 614 and may be a loudspeaker. The sound input module 616 is capable of receiving sounds from the user and may be a microphone. The user can talk with a remote person with the mobile communication device 600, and some additional software or hardware modules must be installed on the mobile communication device 600 for receiving the alarm warning radio signal and obtaining a GPS position data.

Figure 7:
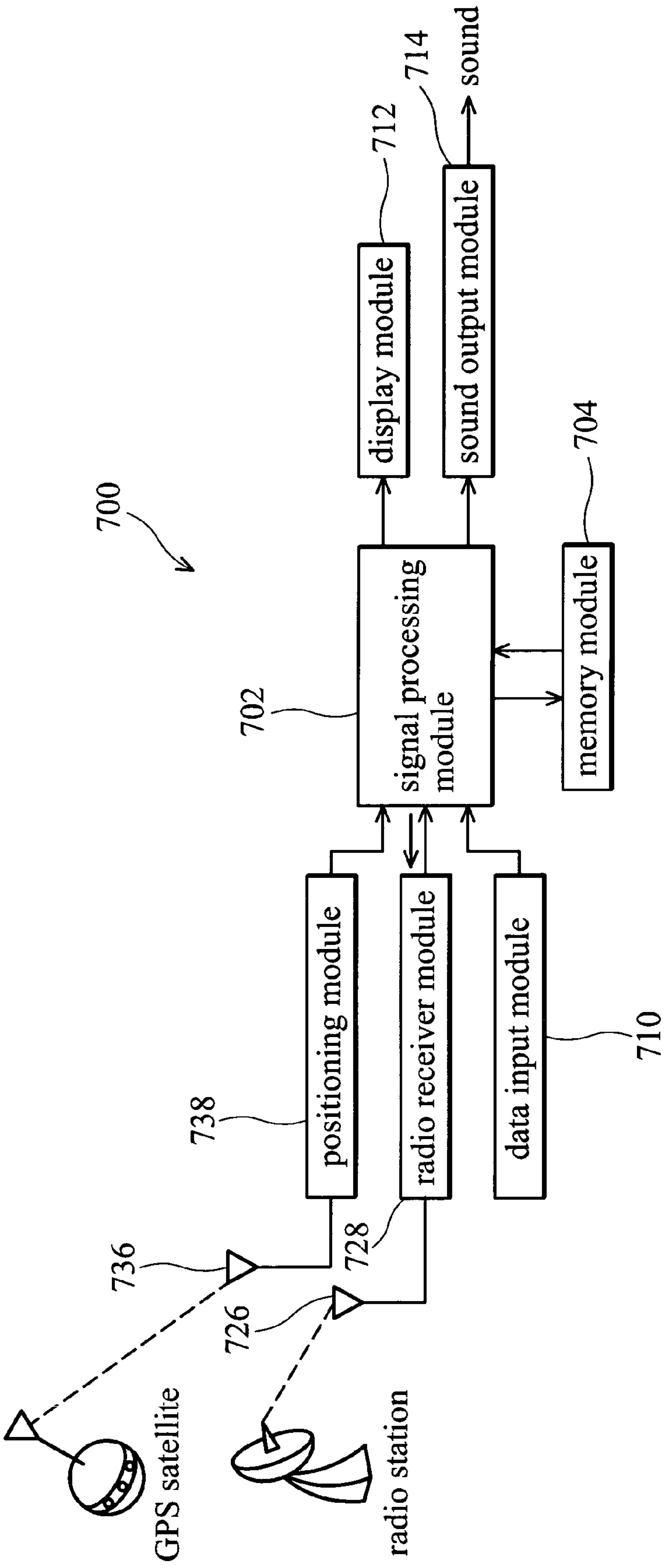
FIG. 7 shows a block diagram of a mobile communication device for receiving alarm warnings according to the invention.

Referring to FIG. 7, it shows a block diagram of a mobile communication device 700 for receiving alarm warnings according to the invention. Although the mobile communication device 700 resembles the mobile communication device 600, there are still differences between them. First, the radio receiver module 728 is capable of demodulating the radio signal received from the antenna 726 to obtain the audio warning messages, and the audio warning messages are then delivered to the signal processing module 702. The radio receiver module 728 may be the radio receiver module 608 of the mobile communication device 600 in case the signal processing module 702 is installed in a software module to demodulate the radio signal. Otherwise, the radio receiver module 728 may be a brand new module independent of the radio receiver module 608. Next, the positioning module 738 and the antenna 736 are installed for receiving a positioning data about the user's position from a GPS satellite. In addition, both a district-warning radio frequency contrast table and a disaster-code contrast table are stored in the memory module 704. The mobile communication device 702 does not require the sound input module 616.

The process for the mobile communication device 702 to implement method 100 is detailed in the following. First, the antenna 736 receives a positioning signal from a GPS satellite. After the positioning signal is processed by the positioning module 738 to generate a positioning data about the user location, the positioning data is delivered to the signal processing module 702. With the positioning data, the signal processing module 702 can then find a warning radio frequency corresponding to the user location in the district-warning radio frequency contrast table stored in the memory module 704. If no positioning module 738 exists, the user location data can be input manually through a data input module 710 as in step 204 of the method 200. A radio signal is received with the antenna 726 and demodulated with the radio receiver module 728 according to the warning radio frequency to obtain an audio warning message.

After the signal processing module 702 receives the audio warning message, it will continue monitoring for a warning alarm tone in the audio warning message. If so, the sound output module 714 broadcasts the audio warning message as a sound to inform the user.

Moreover, the mobile communication device 700 is capable of implementing the method 500. If the signal processing module 702 has detected a warning alarm tone in the audio warning message, the radio receiver module 728 will demodulate a high frequency radio signal. After demodulation, the signal processing module 702 will convert the demodulated high-frequency radio signal from the analog format to a digital format to generate a digital code. The signal processing module 702 can then decode the digital code to generate a warning text message according to the disaster-code contrast table stored in the memory module 704. The warning text message is then displayed on the screen of the display module 712 to inform the user of the disaster.

The invention provides a method for receiving alarm warnings with a mobile communication device. Because the mobile communication device is portable, people do not need to take extra alarm warning receivers with them. In addition, because the invention uses the radio signal to transmit warning messages, the geographical coverage to receive the radio signal is far broader then that of the base station. Moreover, the mobile communication device will automatically receive the warning message according to the user location. Thus, the user is informed of the location of the disaster and takes appropriate actions.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for receiving alarm warnings with a mobile communication device, comprising the steps of:

storing a district-warning radio frequency contrast table in the mobile communication device, wherein the district-warning radio frequency contrast table records a relationship between a plurality of districts and a plurality of warning radio frequencies for broadcasting the audio warning messages corresponding to one of the plurality of districts;

generating a position data indicating a user location with a positioning module;

finding a current warning radio frequency according a current district, wherein the current district is one of the plurality of districts in which the user is located and determined by the position data, and the current warning radio frequency is one of the plurality warning radio frequencies corresponding to the current district in the district-warning radio frequency contrast table;

receiving a radio signal according to the current warning radio frequency and demodulating the radio signal to obtain a current audio warning message corresponding to the current district; and automatically adjusting the current district and current warning radio frequency when the user moves from district to district amongst the plurality of districts according to new position data.

2. The method as claimed in claim 1, further comprising the step of:

monitoring the spectrum of the current audio warning message to detect a warning alarm tone; and broadcasting the current audio warning message with a loudspeaker to inform the user if the warning alarm tone is detected.

3. The method as claimed in claim 1, further comprising the step of:

storing a disaster-code contrast table in the mobile communication device, wherein the disaster-code contrast table records a relationship between a plurality of warning text messages and a plurality of digital codes corresponding to one of the plurality of warning text messages;

demodulating a high-frequency radio signal to obtain a current digital code;

decoding the current digital code according to the disaster-code contrast table to obtain a current warning text message; wherein the current digital code is one of the plurality of digital codes, and the current warning text message is one of the plurality of warning text messages; and showing the first warning text message on a screen of the mobile communication device to inform the user.

4. The method as claimed in claim 3, further comprising the step of:

stopping broadcasting of the current audio warning message with the loudspeaker and clearing the screen of the mobile communication device if the current warning text message represents an end of message.

5. The method as claimed in claim 1, wherein the mobile communication device is selected from the group of a cell phone, a smart phone, a personal digital assistant, and a portable MP3 player.

6. A mobile communication device for receiving alarm warnings, comprising:

a memory module, for storing a district-warning radio frequency contrast table, wherein the district-warning radio frequency contrast table records a relationship between a plurality of districts and a plurality of warning radio frequencies for broadcasting the audio warning messages corresponding to one of the plurality of districts;

a positioning module, generating a position data indicating a user location;

a signal processing module, coupled to the memory module, for finding a current warning radio frequency according to a current district, wherein the current district is one of the plurality of districts in which the user is located and determined by the position data, and the current warning radio frequency is one of the plurality warning radio frequencies corresponding to the current district in the district-warning radio frequency contrast table, and wherein the current district and current warning radio frequency are automatically adjusted when the user moves from district to district amongst the plurality of districts according to new position data; and a radio receiver module, coupled to the signal processing module, for receiving a radio signal according to the current warning radio frequency and demodulating the radio signal to obtain a current audio warning message corresponding to the current district.

7. The mobile communication device as claimed in claim 6, wherein the signal processing module continues monitoring the spectrum of the current audio warning message to detect a warning alarm tone, and the signal processing module broadcasts the current audio warning message with a loudspeaker to inform the user if the warning alarm tone is detected.

8. The mobile communication device as claimed in claim 6, wherein the memory module stores a disaster-code contrast table, the disaster-code contrast table records a relationship between a plurality of warning text messages and a plurality of digital codes corresponding to one of the plurality of warning text messages, and the signal processing module demodulates a high-frequency radio signal to obtain a current digital code, decodes the current digital code according to the disaster-code contrast table to obtain a current warning text message, and shows the current warning text message on a screen of the mobile communication device to inform the user.

9. The mobile communication device as claimed in claim 8, wherein the signal processing module stops broadcasting the audio warning message with the loudspeaker and clears the screen of the mobile communication device if the current warning text message represents an end of message.

10. The mobile communication device as claimed in claim 6, wherein the signal processing module is selected from the group of a digital signal processor (DSP), a controller, and the combination thereof.

11. The mobile communication device as claimed in claim 6, wherein the memory module is selected from the group of a read only memory (ROM) and a random access memory (RAM).

12. The mobile communication device as claimed in claim 6, wherein the mobile communication device is selected from the group of a cell phone, a smart phone, a personal digital assistant, and a portable MP3 player.

13. A mobile communication device for receiving alarm warnings, comprising:

a memory module, for storing a district-warning radio frequency contrast table, wherein the district-warning radio frequency contrast table records a relationship between a plurality of districts and a plurality of warning radio frequencies for broadcasting the audio warning messages corresponding to one of the plurality of districts;

a data input module, for receiving a user location data manually input by the user;

a signal processing module, coupled to the memory module, for finding a current warning radio frequency according to a current district, wherein the current district is one of the plurality of districts in which the user is located and determined by the location data, and the current warning radio frequency is one of the plurality warning radio frequencies corresponding to the current district in the district-warning radio frequency contrast table, and wherein the current district and current warning radio frequency are automatically adjusted when the user moves from district to district amongst the plurality of districts and enters new location data; and a radio receiver module, coupled to the signal processing module, for receiving a radio signal according to the current warning radio frequency and demodulating the radio signal to obtain a current audio warning message corresponding to the current district.

14. The mobile communication device as claimed in claim 13, wherein the signal processing module continues monitoring the spectrum of the current audio warning message to detect a warning alarm tone, and the signal processing module broadcasts the current audio warning message with a loudspeaker to inform the user if the warning alarm tone is detected.

15. The mobile communication device as claimed in claim 13, wherein the memory module stores a disaster-code contrast table, the disaster-code contrast table records a relationship between a plurality of warning text messages and a plurality of digital codes corresponding to one of the plurality of warning text messages, and the signal processing module demodulates a high-frequency radio signal to obtain a current digital code, decodes the current digital code according to the disaster-code contrast table to obtain a current warning text message, and shows the current warning text message on a screen of the mobile communication device to inform the user.

16. The mobile communication device as claimed in claim 15, wherein the signal processing module stops broadcasting the current audio warning message with the loudspeaker and clears the screen of the mobile communication device if the current warning text message represents an end of message.

17. The mobile communication device as claimed in claim 13, wherein the data input module is a set of keys.

18. The mobile communication device as claimed in claim 13, wherein the mobile communication device is selected from the group of a cell phone, a smart phone, a personal digital assistant, and a portable MP3 player.

* * * * *